(12) United States Patent
Sodeno

(10) Patent No.: US 7,148,656 B2
(45) Date of Patent: Dec. 12, 2006

(54) CAPACITY ADJUSTMENT APPARATUS FOR BATTERY PACK AND CAPACITY ADJUSTMENT METHOD FOR BATTERY PACK

(75) Inventor: Tsuyoshi Sodeno, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/080,844

(22) Filed: Mar. 16, 2005

(65) Prior Publication Data

US 2005/0212487 A1 Sep. 29, 2005

(30) Foreign Application Priority Data

Mar. 23, 2004 (JP) .............................. 2004-084588

(51) Int. Cl.
*H02J 7/00* (2006.01)
(52) U.S. Cl. ...................................... 320/132
(58) Field of Classification Search ................ 320/132, 320/136, 104, 120, 116; 180/65.2; 318/139
See application file for complete search history.

(56) References Cited

U.S. PATENT DOCUMENTS

| | | | | |
|---|---|---|---|---|
| 5,767,636 A | * | 6/1998 | Kanazawa et al. | 318/139 |
| 5,785,138 A | * | 7/1998 | Yoshida | 180/65.2 |
| 6,160,380 A | * | 12/2000 | Tsuji et al. | 320/132 |
| 6,417,648 B1 | * | 7/2002 | Suzuki et al. | 320/136 |
| 6,751,960 B1 | * | 6/2004 | Arimitsu et al. | 60/706 |
| 6,932,174 B1 | * | 8/2005 | Hirata et al. | 180/65.2 |
| 7,019,489 B1 | * | 3/2006 | Nakada | 320/104 |

FOREIGN PATENT DOCUMENTS

EP 1289096 * 6/2003
JP 10-322925 A 12/1998

* cited by examiner

*Primary Examiner*—Pia Tibbits
(74) *Attorney, Agent, or Firm*—Foley & Lardner LLP (57) ABSTRACT

A control unit calculates target power to be generated based upon a bypass engaging voltage used as a reference voltage at which a capacity adjustment circuit executes a capacity adjustment, and issues a power generation command for an inverter so as to generate the target power if it is decided that the capacities of the individual cells need to be adjusted.

8 Claims, 8 Drawing Sheets

CAPACITY ADJUSTMENT APPARATUS FOR BATTERY PACK AND CAPACITY ADJUSTMENT METHOD FOR BATTERY PACK

BACKGROUND OF THE INVENTION

1. Field of the Invention

The present invention relates to a capacity adjustment apparatus and a capacity adjustment method to be adopted in conjunction with a battery pack constituted with a plurality of cells.

2. Description of Related Art

There is an apparatus known in the related art that detects open circuit voltages of a plurality of cells constituting a battery pack and adjusts the capacities of the cells by individually discharging the cells based upon the voltage distribution of the detected open circuit voltages (see Japanese Laid Open Patent Publication No. H10-322925).

SUMMARY OF THE INVENTION

However, since the apparatus in the related art discharges the cells in reference to the lowest voltage among the detected cell voltages, a problem arises when there is a significant variance among the voltages in that the electrical charges at the other cells whose voltages have not become low are discharged wastefully.

A battery pack capacity adjustment apparatus for a battery pack constituted by connecting in serious a plurality of cells includes capacity adjustment circuits each provided in correspondence to one of the plurality of cells to execute a capacity adjustment by discharging the corresponding cell if a voltage at the corresponding cell exceeds a predetermined bypass engaging voltage, a power generation device that generates power used to charge the battery pack, a capacity adjustment decision-making device that makes a decision as to whether or not capacity adjustment needs to be executed for the battery pack, a target power generation calculation device that calculates target power to be generated based upon the bypass engaging voltage, and a power generation control device that issues a power generation command for the power generation device so as to generate the target power calculated by the target power generation calculation device if the capacity adjustment decision-making device determines that the capacity adjustment is necessary.

A battery pack capacity adjustment method for adjusting capacities of a plurality of cells constituting a battery pack by using capacity adjustment circuits each provided in correspondence to one of the plurality of cells to discharge the corresponding cell if a voltage at the corresponding cell exceeds a predetermined bypass engaging voltage includes steps for making a decision as to whether or not a capacity adjustment needs to be executed for the battery pack, calculating target power to be generated based upon the bypass engaging voltage, and issuing a power generation command for a power generation device that generates power used to charge the battery pack so as to generate the target power if the capacity adjustment for the battery pack is determined to be necessary.

DETAILED DESCRIPTION OF THE PREFERRED EMBODIMENT

Figure 1:
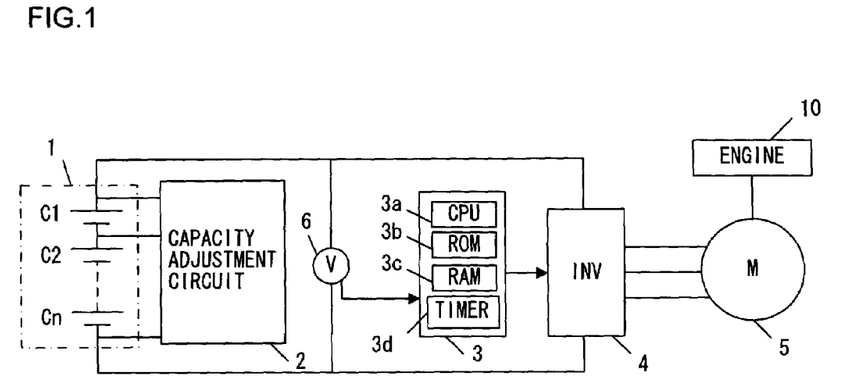
FIG. 1 shows the system configuration of an embodiment in which the battery pack capacity adjustment apparatus according to the present invention is adopted in a hybrid car.

FIG. 1 shows the system configuration of an embodiment in which the battery pack capacity adjustment apparatus according to the present invention is adopted in a hybrid car. A battery pack 1 is constituted by connecting in series n (n: positive integer) cells C1 to Cn. An AC voltage obtained by converting at an inverter 4 a DC voltage of the battery pack 1 is applied to a three-phase AC motor 5 which is a traveling drive source of the vehicle. A control unit 3, which includes a CPU 3a, a ROM 3b, a RAM 3c and a timer 3d, charges and discharges the battery pack 1 by controlling the inverter 4. A voltage sensor 6 detects the total voltage $V_{bat}$ at the battery pack 1 and outputs the detected total voltage to the control unit 3.

Figure 2:
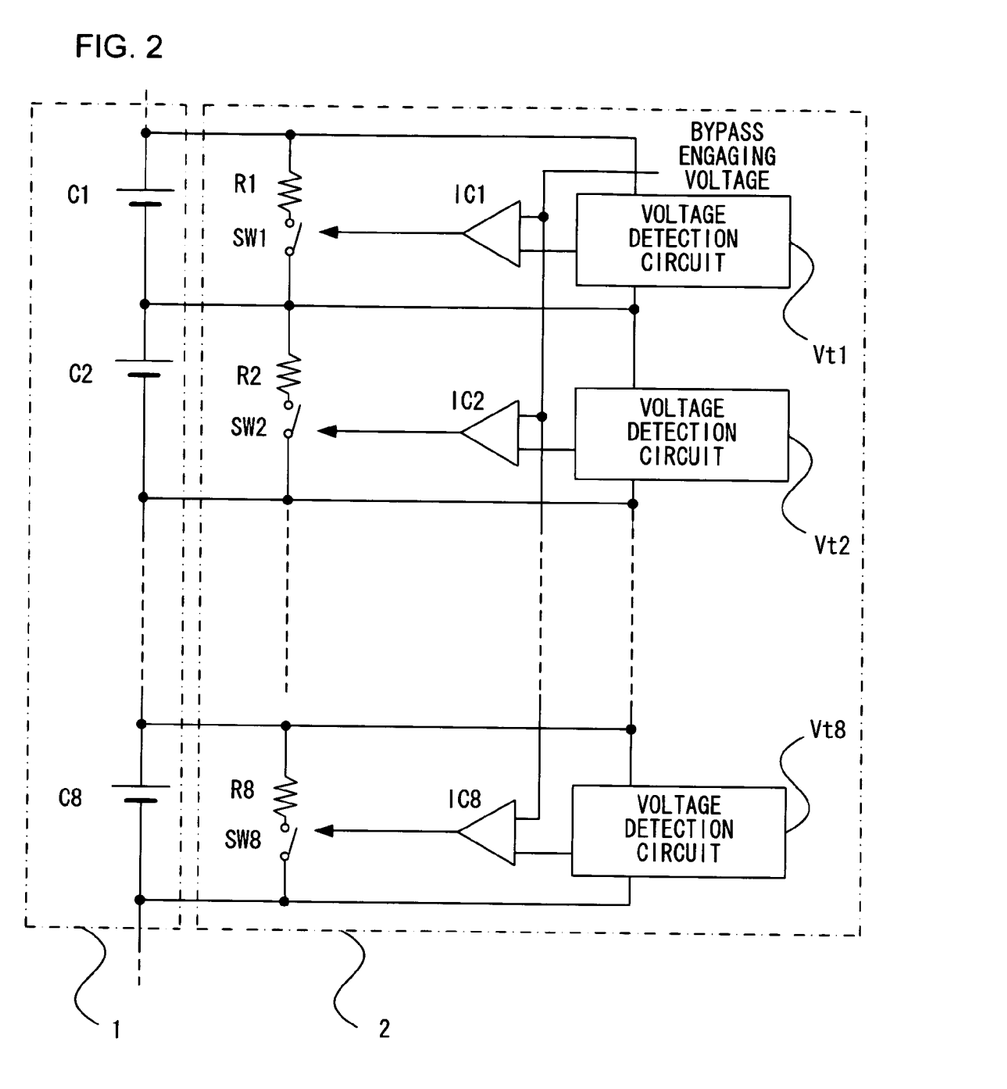
FIG. 2 shows in detail the structure adopted in the capacity adjustment circuit (bypass circuit)

FIG. 2 shows in detail a capacity adjustment circuit (bypass circuit) 2. In order to simplify the explanation, it is assumed that the battery pack 1 is constituted with 8 cells C1 to C8. The capacity adjustment circuit 2 includes voltage detection circuits Vt1 to Vt8, voltage comparators IC1 to IC8, bypass resistors R1 to R8 and switches SW1 to SW8. The voltage detection circuits Vt1 to Vt8, each provided in conjunction with one of the cells, detect the voltages at the corresponding cells C1 to C8.

The voltage comparators IC1 to IC8 compare the cell voltages detected by the voltage detection circuits Vt1 to Vt8 respectively with a predetermined bypass engaging voltage $V_{bps}$ (threshold voltage $V_{bps}$) and output the results of the comparison to the corresponding switches SW1 to SW8. If a signal indicating that the cell voltage is higher than the bypass engaging voltage $V_{bps}$ is input from any of the voltage comparators 1C1 to 1C8, the corresponding switch SW1 to SW8 enters an ON state. If, for instance, the switch SW1 is turned on, a current flows from the cell C1 via the bypass resistor R1 connected in series with the switch SW1. Namely, if a cell voltage exceeds the bypass engaging voltage $V_{bps}$, the cell is discharged via the corresponding bypass resistor. As a result, the extent of variance among the voltages at the individual cells is reduced.

Figure 3:
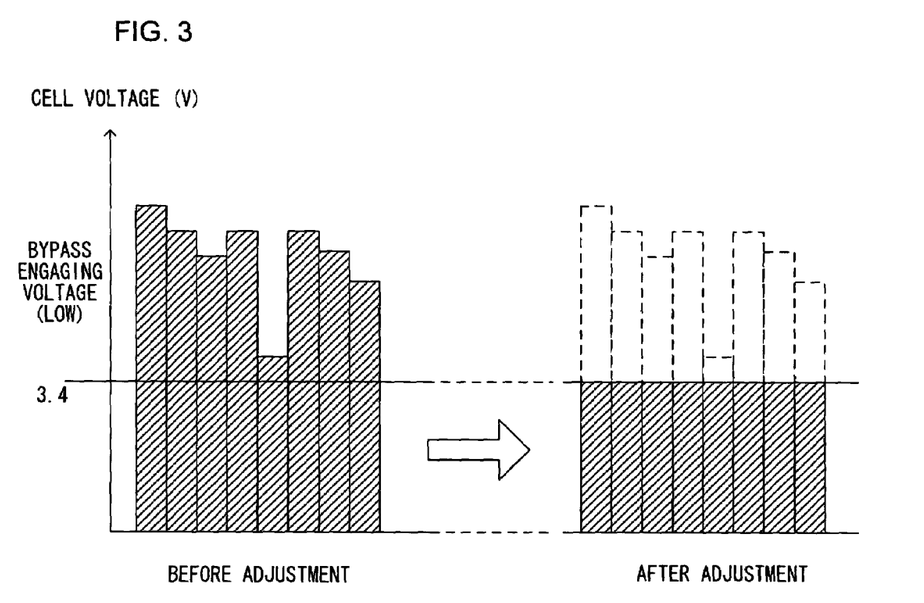
FIG. 3 shows the pre-capacity adjustment variance among the voltages at the individual cells and the post capacity adjustment voltage variance manifesting when the bypass engaging voltage is set to a low value (3.4V)

FIG. 3 shows the pre-capacity adjustment voltage variance among the individual cells and the post-capacity adjustment voltage variance manifesting when the bypass engaging voltage is set to a low value (3.4V). As shown in FIG. 3, while the voltages at the individual cells are adjusted so as to achieve uniformity through the capacity adjustment, a great deal of power is discharged, resulting in a significant energy loss when the bypass engaging voltages set to a low value.

Accordingly, the bypass engaging voltage $V_{bps}$ is set to a considerably higher value in the battery pack capacity adjustment apparatus in the embodiment. In this example, the bypass engaging voltage $V_{bps}$ is set to a value (e.g., 3.9V) which is higher than the average of the voltages at the individual cells detected when they are charged/discharged in a regular charge/discharge mode (with the target charging rate at 50%).

Figure 4:
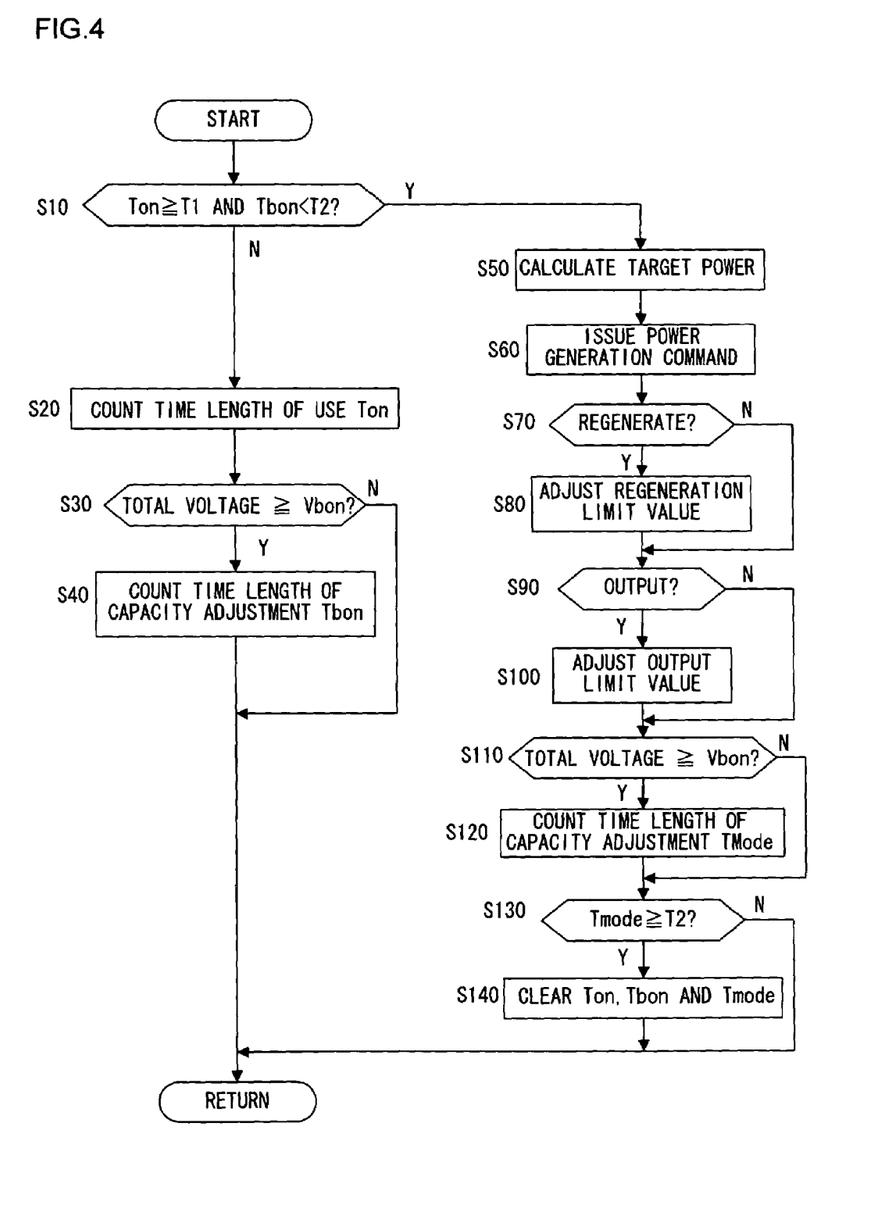
FIG. 4 presents a flowchart of the capacity adjustment procedure executed by the battery pack capacity adjustment apparatus achieved in the embodiment.
Figure 9:
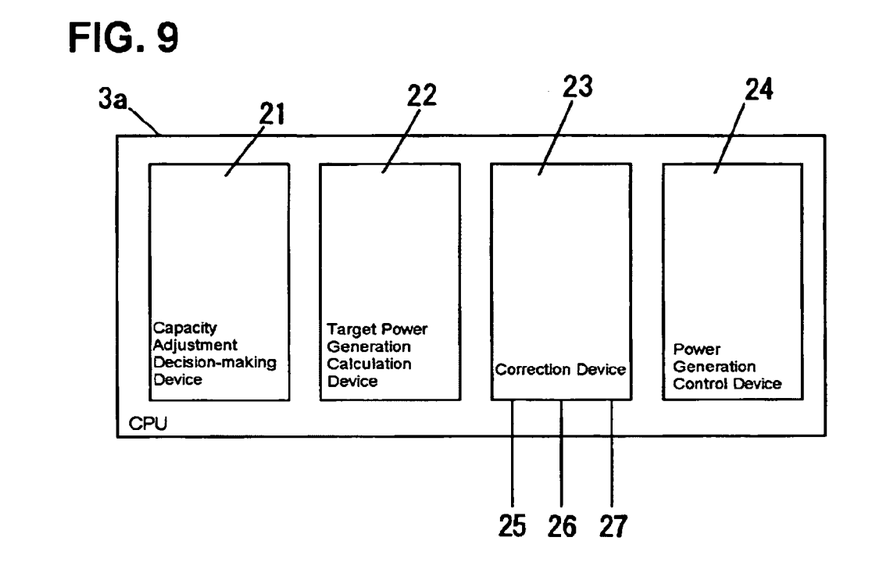
FIG. 9 shows a CPU capable of carrying out the capacity adjustment procedure of FIG. 4.

FIG. 4 presents a flowchart of the capacity adjustment procedure executed by the battery pack capacity adjustment apparatus according to one embodiment of the present invention. The processing, which starts in step S10, is executed by the CPU 3a in the control unit 3 over predetermined time intervals (e.g., every 10 ms). Individual components that carry out the processing by CPU 3a are shown in FIG. 9. These components include: a capacity adjustment decision-making device 21, a target power generation calculation device 22, a correction device 23, and a power generation control device 24.

As described in more detail below in relation to the procedure outlined in FIG. 4, the capacity adjustment decision-making device 21 makes a decision as to whether or not capacity adjustment needs to be executed for the battery pack as carried out in step S10 of FIG. 4. The target power generation calculation device 22 calculates target power to be generated based upon the bypass engaging voltage as carried out in step S50 of FIG. 4. The correction device 23 corrects the target power calculated by the target power generation calculation device 22 based upon conditions of the battery pack as carried out in step S50 of FIG. 4. These battery pack conditions include at least one of: an SOC 25, a temperature 26, and an extent of degradation at the battery pack 27. The power generation control device 24 issues a power generation command for the power generation device so as to generate the target power calculated by the target power generation calculation device 22 if the capacity adjustment decision-making device 21 detennines that the capacity adjustment is necessary as carried out in steps S60–80 of FIG. 4.

Referring to FIG. 4, instep S10, a decision is made as to whether or not charge/discharge control is to be executed in a capacity adjustment mode, which is to be detailed later. The decision is made in this embodiment by determining whether or not the time length $T_{on}$ over which the hybrid car having installed therein the battery pack capacity adjustment apparatus in the embodiment has been in use is equal to or greater than a predetermined length of time T1 and whether or not the time length $T_{bon}$ over which the capacity adjustment has been executed is less than a predetermined length of time T2. Values stored in the RAM 3c are used for the time length $T_{on}$ of hybrid car use and the time length $T_{bon}$ of the capacity adjustment. If the time length of use $T_{on}$ is equal to or greater than the predetermined length of time T1 and the time length of the capacity adjustment $T_{bon}$ is less than the predetermined length of time T2, the capacity adjustment is judged to be necessary and the operation proceeds to step S50, whereas the operation proceeds to step S20 otherwise.

Figure 5:
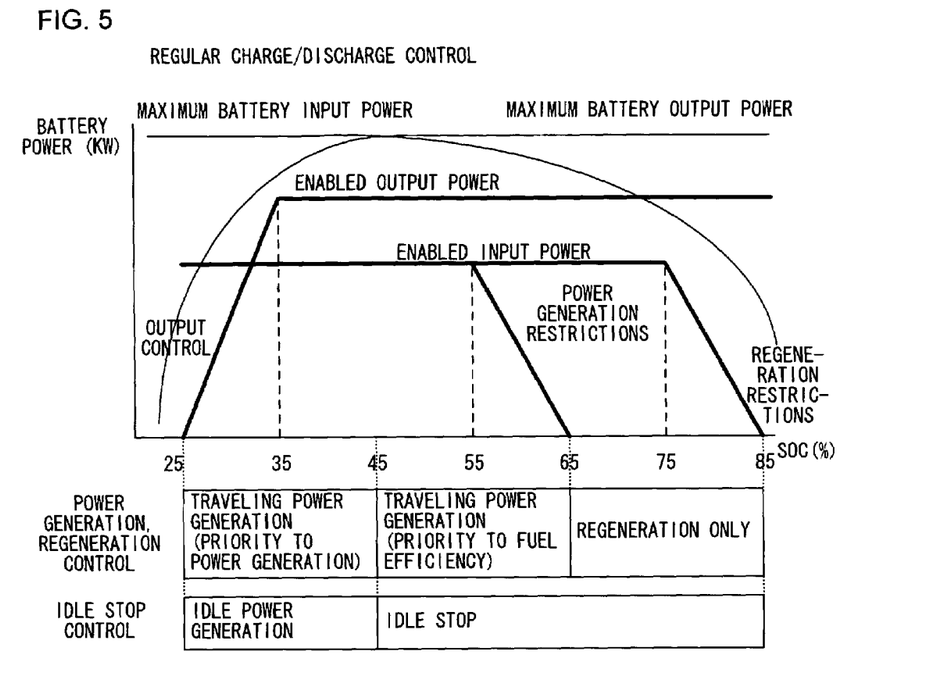
FIG. 5 shows the relationship between the SOC (%) at the battery pack and the power in the battery pack in the regular charge/discharge mode.

The processing is executed in steps S20 through S40 to implement control in the regular charge/discharge mode. FIG. 5 shows the relationship between the SOC (%) at the battery pack 1 and the power in the battery pack 1 in the regular charge/discharge mode. The enabled output power from the battery pack 1 is set equal to or less than the maximum output power of the battery pack 1, whereas the enabled input power to the battery pack 1 is set to a value equal to or less than the maximum input power. It is to be noted that the margin between the enabled output power and the maximum output power and the margin between the enabled input power and the maximum input power should be set so as to assure the rated time output and the rated time input and to allow a power output and a power input over short periods of time within the margins.

Under the control implemented in the regular charge/discharge mode, the motor 5 is determined to be either in a power running state or in a regenerated operating state based upon the driving state in which the driver is driving the vehicle and decisions with regard to the power generating state of the motor 5 and with regard to whether or not the engine 10 is in the state of an idle stop are made in correspondence to the SOC at the battery pack 1. For instance, in an SOC range of 25(%)≦SOC<45(%), the traveling power generation control under which priority is given to power generation by the motor 5 driven by the engine 10 is executed as shown in FIG. 5. In addition, even when the idle stop conditions are present, an idle stop is not applied and power generation by the motor 5 is executed by using the engine 10 as the motive power source. It is to be noted that once the SOC becomes equal to or less than 35%, control is implemented to regulate output from the battery pack 1.

In an SOC range of 45(%)≦SOC<65(%), traveling power generation control under which priority is given to the fuel efficiency of the engine 10 while generating power with the motor 5 by using the engine 10 as the motive power source is executed. In addition, if the idle stop conditions exist, an idle stop is applied to stop the engine 10. Once the SOC exceeds 55%, control for restricting the power generation achieved by using the engine 10 as the motive power source is executed.

In an SOC range of 65(%)≦SOC<85(%), power is not generated by using the engine 10 as the motive power source and only regenerated power generation control under which the deceleration energy manifesting as the vehicle decelerates or the like is utilized is executed. If the idle stop conditions exist, an idle stop is applied as well. It is to be noted that once the SOC exceeds 75%, control for restricting the quantity of power generated through the regenerated power generation starts.

In step S20, the timer 3d starts to count the time length $T_{on}$ of vehicle use. The time length of vehicle use $T_{on}$ is represented by a cumulative value indicating the overall length of time over which the hybrid car has been on and the value representing the time length of vehicle use is stored into the RAM 3c as the key switch (not shown) is turned off. Namely, the count of the time length of vehicle use $T_{on}$ starts in step S20 by counting up from the time length of vehicle use $T_{on}$ stored in the RAM 3c.

In step S30 following step S20, a decision is made as to whether or not the total voltage detected by the voltage sensor 6 is equal to or greater than a predetermined voltage $V_{bon}$. The predetermined voltage $V_{bon}$ assumes a value expressed as; $V_{bon}=V_{bps} \times n$ (with $V_{bps}$ representing the bypass engaging voltage and n representing the number of cells). If the total voltage at the battery pack 1 is equal to or greater than the predetermined voltage $V_{bon}$, it is judged that the capacity adjustment is currently executed by the capacity adjustment circuit 2 and the operation proceeds to step S40, whereas the processing in the flowchart presented in FIG. 4 ends if the total voltage is determined to be less than the predetermined voltage $V_{bon}$.

In step S40, the timer 3*d* counts the time length of capacity adjustment T$_{bon}$. The time length of capacity adjustment T$_{bon}$ is represented by a cumulative value indicating the overall length of time over which the capacity adjustment circuit (bypass circuit) 2 has been engaged in operation, and the value representing the time length of capacity adjustment is stored into the RAM 3*c* as the key switch (not shown) is turned off. Namely, the count of the time length of capacity adjustment T$_{bon}$ is started by counting up from the time length of capacity adjustment T$_{bon}$ stored in the RAM 3*c*. As the count of the time length of capacity adjustment T$_{bon}$ starts, the processing in the flowchart presented in FIG. 4 ends.

Processing is executed in steps S50 through S140 to implement control in the capacity adjustment mode. In step S50, target power to be generated is calculated. A target voltage increase V$_{up}$ is calculated as V$_{up}$=V$_{bps}$−Vo based upon the open circuit voltage value Vo corresponding to the current battery pack SOC ascertained at the time of the target power calculation and the bypass engaging voltage V$_{bps}$. With R representing the internal resistance at the battery pack 1, a current I$_{up}$ determined based upon the voltage V$_{up}$ and the internal resistance R is expressed as; I$_{up}$=V$_{up}$/R.

It is to be noted that the internal resistance R at the battery pack 1 may be calculated through any of various methods. For instance, it may be calculated as indicated in (1) below by determining a change ΔV occurring in the voltage and a change ΔI occurring in the current. The internal resistance R calculated by using expression (1) assumes a value that reflects the temperature at the battery pack 1 and the extent of degradation at the battery pack 1, i.e., a value having been corrected based upon the temperature at the battery pack and the extent of degradation.

$$R=\Delta V/\Delta I \qquad (1)$$

The target power P$_{up}$ required to raise the voltage at the battery pack 1 by V$_{up}$ is expressed as; P$_{up}$=V$_{up}$×I$_{up}$. Since the internal resistance R assumes a value reflecting the temperature and the degradation at the battery pack 1 as described above, the target power generation P$_{up}$, too, takes on a value reflecting the temperature and the extent of degradation at the battery pack 1.

Figure 6:
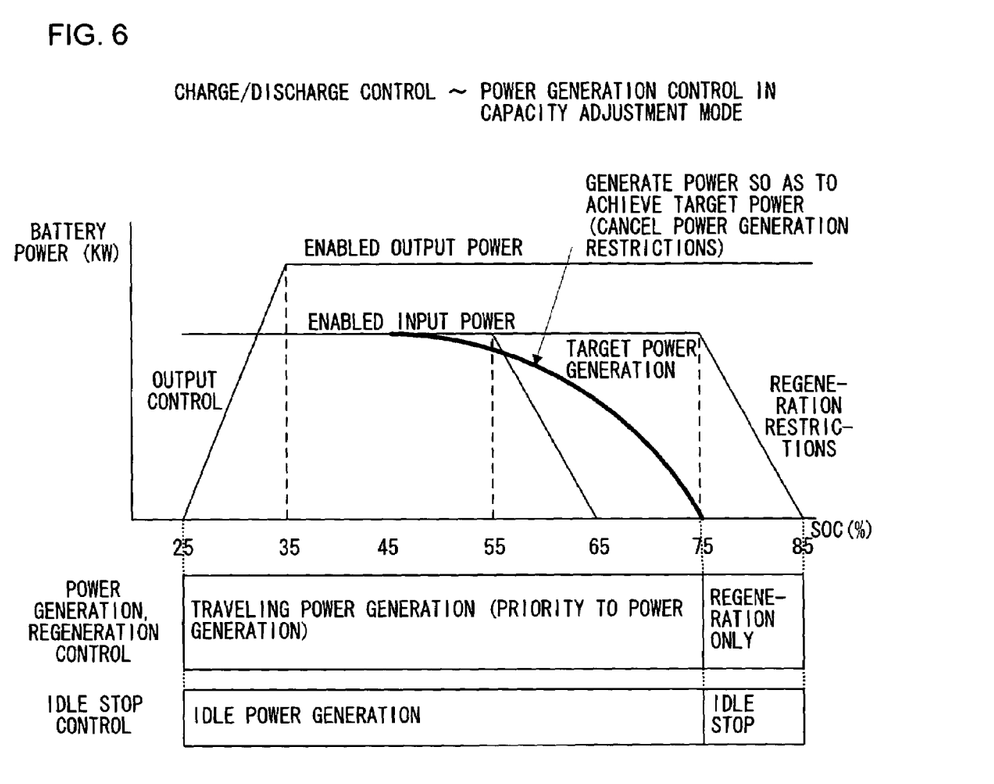
FIG. 6 shows the relationship between the SOC (%) at the battery pack and the power in the battery pack in the capacity adjustment mode.

FIG. 6 shows the relationship between the SOC (%) at the battery pack 1 and the power in the battery pack 1 manifesting in the capacity adjustment mode. As FIG. 6 indicates, in an SOC range of 25(%)≦SOC<75(%), control under which priority is given to power generation by the motor 5 driven by the engine 10 is implemented. Even when the idle stop conditions exist, an idle stop is not applied and control is implemented to generate power by using the engine 10 as the motive power source. In addition, the power generation restriction control, which is executed in the regular charge/discharge mode, is not implemented, and instead, power generation control is implemented so as to generate the target power corresponding to the SOC with the motor 5.

In an SOC range of 75(%)≦SOC<85(%), power is not generated by using the engine 10 as the motive power source and only regenerated power generation control under which deceleration energy manifesting as the vehicle decelerates or the like is utilized is executed. If the idle stop conditions exist, an idle stop is applied as well.

In step S60, a command indicating the target power P$_{up}$ calculated in step S50 is issued to the inverter 4 and thus, the motor 5 is controlled so as to generate the target power P$_{up}$. In step S70 following step S60, a decision is made as to whether or not conditions under which the motor 5 engages in regenerated operation exist. The operation proceeds to step S80 if the conditions for regenerated operation are determined to exist, whereas the operation proceeds to step S90 if it is decided that the conditions for regenerated operation do not exist.

Figure 7:
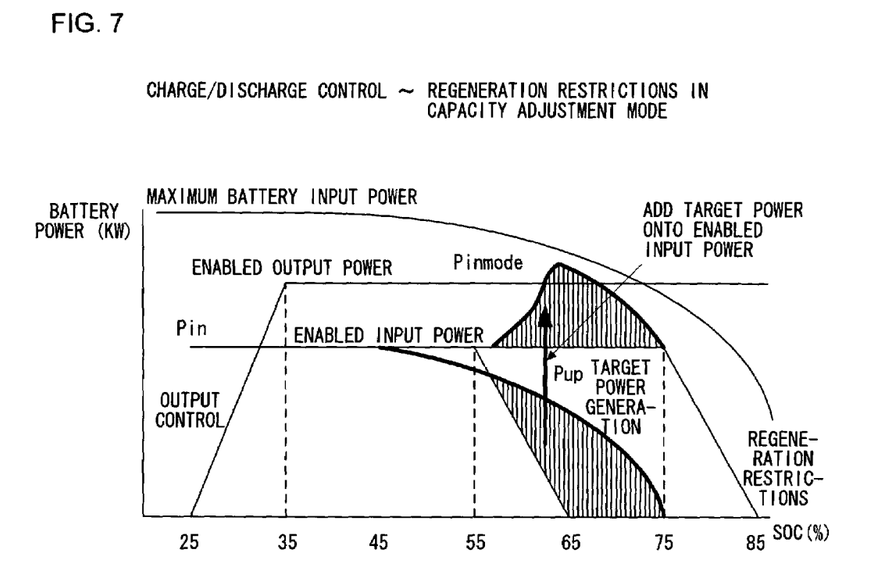
FIG. 7 shows the line representing the adjusted regeneration limit value.

In step S80, a limit value set for the quantity of power to be generated through regeneration is adjusted. FIG. 7 shows a line representing the adjusted regeneration limit value. As shown in FIG. 7, a value obtained by adding the target power P$_{up}$ to the normal enabled input power P$_{in}$, i.e., P$_{inmode}$=P$_{in}$+P$_{up}$, represents the enabled input power in the capacity adjustment mode. In this case, the limit value for the quantity of power generated through regeneration (the quantity of power that can be generated through regeneration) becomes high. However, it should be ensured that the enabled input power P$_{inmode}$ does not exceed the maximum input power of the battery pack 1.

In step S90, a decision is made as to whether or not the battery pack 1 is in an output state, i.e., whether or not the power in the battery pack 1 is ready for use. The operation proceeds to step S100 if the battery pack 1 is determined to be in the output state, whereas the operation proceeds to step S110 if it is decided that the battery pack 1 is not in the output state.

Figure 8:
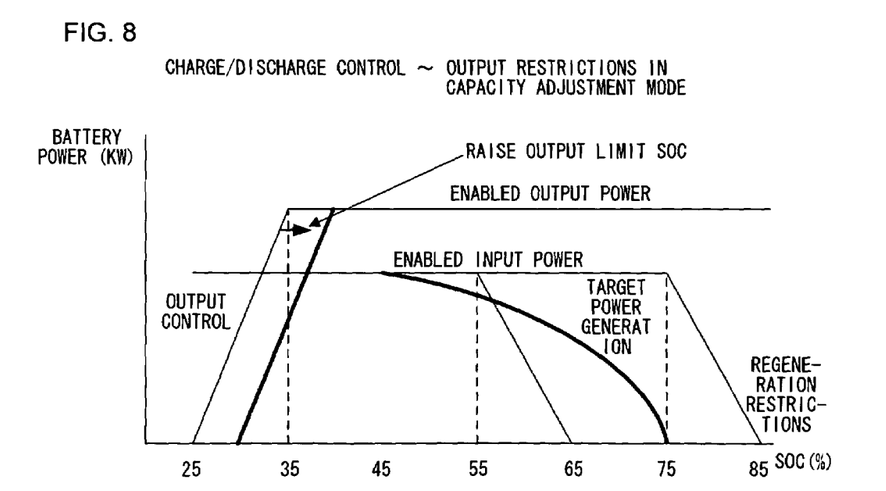
FIG. 8 shows the line representing the adjusted output limit value.

In step S100, an output limit value for the battery pack 1 is adjusted. FIG. 8 shows the line representing the adjusted output limit value. As FIG. 8 indicates, the line representing the pre-adjustment output limit value is shifted so as to raise the SOC. Namely, the SOC at which the output restriction on the battery pack 1 start is raised so as to apply the output restriction sooner than in the regular charge/discharge mode. Once the output limit value is adjusted, the operation proceeds to step S110.

In step S110, a decision is made as to whether or not the total voltage at the battery pack 1 detected by the voltage sensor 6 is equal to or greater than a predetermined voltage V$_{bon}$. If the total voltage at the battery pack 1 is equal to or greater than the predetermined voltage V$_{bon}$, it is judged that the capacity adjustment is currently executed by the capacity adjustment circuit 2 and the operation proceeds to step S120, whereas the processing in the operation proceeds to step S130 if the total voltage at the battery pack 1 is smaller than the predetermined voltage V$_{bon}$.

In step S120, the timer 3*d* starts a count of the time length of capacity adjustment T$_{mode}$. The time length of capacity adjustment T$_{mode}$ is the cumulative length of time over which the capacity adjustment circuit (bypass circuit) 2 has been engaged in operation in the capacity adjustment mode, and a value representing the cumulative length of time is stored into the RAM 3*c* when the key switch (not shown) is turned off. Accordingly, the count of the time length of capacity adjustment T$_{mode}$ starts at this time by counting up from the time length of capacity adjustment T$_{mode}$ already stored in the RAM 3*c*.

In step S130, a decision is made as to whether or not the time length of capacity adjustment T$_{mode}$ the count of which has been started in step S120 is equal to or greater than the predetermined length of time T2. If the time length of capacity adjustment T$_{mode}$ is equal to or greater than the predetermined length of time T2, the operation proceeds to step S140 judging that the capacity adjustment has been completed, whereas if the time length of capacity adjustment T$_{mode}$ is determined to be less than the predetermined length of time T2, the processing in the flowchart presented in FIG. 4 ends. In step S140, the time length T$_{on}$ of vehicle use, the time length of capacity adjustment T$_{bon}$ corresponding to the regular charge/discharge mode and the time length of capacity adjustment T$_{mode}$ corresponding to the capacity adjustment mode are cleared before the processing in the flowchart presented in FIG. 4 ends. It is to be noted that when the key switch (not shown) in the vehicle is turned off, the time length $T_{on}$ of vehicle use, the time length of capacity adjustment $T_{bon}$ corresponding to the regular charge/discharge mode and the time length of capacity adjustment $T_{mode}$ corresponding to the capacity adjustment mode are stored into the RAM 3c.

When it is decided that the capacity of the battery pack needs to be adjusted, the battery pack capacity adjustment apparatus in the embodiment charges the battery pack 1 by issuing a power generation command for the inverter 4 so as to generate the target power calculated based upon the bypass engaging voltage at the capacity adjustment circuit, and as a result, the capacity adjustment is executed with a minimum energy loss. In other words, a direct capacity adjustment is achieved by using power generated based upon the bypass engaging voltage, regardless of whether the bypass engaging voltage is at high level or lower level. In addition, the capacity adjustment can be executed with a high degree of reliability when the bypass engaging voltage is set to a relatively high value in order to prevent wasteful discharge during the capacity adjustment.

Since the target power calculated based upon the bypass engaging voltage assumes a value which has been corrected based upon the battery pack conditions such as the SOC, the temperature and the extent of degradation at the battery pack, an optimal capacity adjustment reflecting the battery pack conditions can be executed.

In addition, under circumstances in which the power generation control implemented based upon the target power generation would lower the amount of the regenerated energy absorption in the vehicle, the regenerated energy absorption threshold value is increased by raising the quantity of power that can be input to the battery pack 1 ($P_{in}$->$P_{inmode}$), and thus, the normal quantity of regenerated energy is assured. As a result, the performance of the vehicle is not adversely affected during the charge/discharge control implemented in the capacity adjustment mode.

The battery pack capacity adjustment apparatus in the embodiment raises the SOC at which the output restrictions are imposed on the battery pack 1 (see FIG. 8) if the capacity adjustment is determined to be necessary, and thus, the battery pack operating SOC range can be shifted toward the higher side. Since this reduces the difference between the cell voltages and the bypass engaging voltage, the length of time to elapse before the cell voltages become equal to the bypass engaging voltage during the power generation control implemented based upon the target power generation can be reduced.

The present invention is not limited to the embodiment explained above. For instance, while it is judged in step 10 in the flowchart presented in FIG. 4 that the capacity adjustment for the battery pack 1 is necessary if the time length $T_{on}$ of vehicle use is equal to or greater than the predetermined length of time T1 and the time length $T_{bon}$ over which the capacity adjustment circuit 2 has been engaged in operation is less than the predetermined length of time T2, the decision with regard to the need for the capacity adjustment may be made by adopting another method. For instance, it may be decided that the cell voltages manifest a variance error and thus, the capacity adjustment is necessary if the voltage at a given cell is equal to or lower than a predetermined low-voltage decision-making voltage and the average voltage among all the cells is equal to or higher than a predetermined voltage.

Furthermore, while an explanation is given above on an example in which the bypass engaging voltage is set at 3.9V, the bypass engaging voltage may be set to a level higher than the 3.9V or a level lower than 3.9V. Moreover, while an explanation is given above on an example in which the battery pack capacity adjustment apparatus is adopted in a hybrid car, it may instead be adopted in an electric car or a system other than a vehicle.

The disclosure of the following priority application is herein incorporated by reference:
Japanese Patent Application No. 2004-84588 filed Mar. 23, 2004

What is claimed is:

1. A battery pack capacity adjustment apparatus for a battery pack constituted by connecting in series a plurality of cells, comprising:
   capacity adjustment circuits each provided in correspondence to one of the plurality of cells to execute a capacity adjustment by discharging the corresponding cell if a voltage at the corresponding cell exceeds a predetermined bypass engaging voltage;
   a power generation device that generates power used to charge the battery pack;
   a capacity adjustment decision-making device that makes a decision as to whether or not capacity adjustment needs to be executed for the battery pack;
   a target power generation calculation device that calculates target power to be generated based upon the bypass engaging voltage; and
   a power generation control device that issues a power generation command for the power generation device so as to generate the target power calculated by the target power generation calculation device if the capacity adjustment decision-making device determines that the capacity adjustment is necessary.

2. A battery pack capacity adjustment apparatus according to claim 1, wherein:
   the power generation control device does not implement power generation restriction control on the power generation device while the power generation command for generating the target power is outputted and restricts the quantity of charge into the battery pack by implementing power generation control while the power generation command is not outputted.

3. A battery pack capacity adjustment apparatus according to claim 1, further comprising:
   a correction device that corrects the target power calculated by the target power generation calculation device based upon conditions of the battery pack.

4. A battery pack capacity adjustment apparatus according to claim 3, wherein:
   the battery pack conditions include at least one of: an SOC, a temperature and an extent of degradation at the battery pack.

5. A battery pack capacity adjustment apparatus according to claim 2, wherein:
   the battery pack capacity adjustment apparatus is installed in a vehicle, and
   the power generation control device increases a threshold quantity for regenerated energy absorption if the target power generated by the power generation device exceeds a power generation limit quantity and would lower the threshold quantity for the regenerated energy absorption in the vehicle.

6. A battery pack capacity adjustment apparatus according to claim 1, wherein:
   an SOC at which output restrictions are imposed on the battery pack is raised if the capacity adjustment decision-making device decides that the capacity adjustment is necessary.

7. A battery pack capacity adjustment apparatus for a battery pack constituted by connecting in series a plurality of cells, comprising:
   capacity adjustment means, each provided in correspondence to one of the plurality of cells, for executing a capacity adjustment by discharging the corresponding cell if a voltage at the corresponding cell exceeds a predetermined bypass engaging voltage;
   a power generation means for generating power used to charge the battery pack;
   a capacity adjustment decision-making means for making a decision as to whether or not capacity adjustment needs to be executed for the battery pack;
   a target power generation calculation means for calculating target power to be generated based upon the bypass engaging voltage; and
   a power generation control means for issuing a power generation command for the power generation means so as to generate the target power calculated by the target power generation calculation means if the capacity adjustment decision-making means determines that the capacity adjustment is necessary.

8. A battery pack capacity adjustment method for adjusting capacities of a plurality of cells constituting a battery pack by using capacity adjustment circuits each provided in correspondence to one of the plurality of cells to discharge the corresponding cell if a voltage at the corresponding cell exceeds a predetermined bypass engaging voltage, comprising steps for:
   making a decision as to whether or not a capacity adjustment needs to be executed for the battery pack;
   calculating target power to be generated based upon the bypass engaging voltage; and
   issuing a power generation command for a power generation device that generates power used to charge the battery pack so as to generate the target power if the capacity adjustment for the battery pack is determined to be necessary.

* * * * *